United States Patent
Hama et al.

(10) Patent No.: US 11,285,693 B2
(45) Date of Patent: Mar. 29, 2022

(54) DECORATIVE MOLDED ARTICLE

(71) Applicant: NISSHA CO., LTD., Kyoto (JP)

(72) Inventors: Daichi Hama, Kyoto (JP); Yasuhide Fukada, Kyoto (JP); Tatsuo Ito, Kyoto (JP); Eiji Kawashima, Kyoto (JP)

(73) Assignee: NISSHA CO., LTD., Kyoto (JP)

(*) Notice: Subject to any disclaimer, the term of this patent is extended or adjusted under 35 U.S.C. 154(b) by 0 days.

(21) Appl. No.: 17/496,795

(22) Filed: Oct. 8, 2021

(65) Prior Publication Data
US 2022/0024178 A1 Jan. 27, 2022

Related U.S. Application Data (63) Continuation of application No. PCT/JP2020/009906, filed on Mar. 9, 2020.

(30) Foreign Application Priority Data

Apr. 18, 2019 (JP) ............................ JP2019-079182

(51) Int. Cl.
  *B32B 7/023* (2019.01)
  *B32B 5/02* (2006.01)

(52) U.S. Cl.
  CPC .............. *B32B 7/023* (2019.01); *B32B 5/022* (2013.01); *B32B 2260/021* (2013.01); *B32B 2307/402* (2013.01); *B32B 2307/412* (2013.01); *B32B 2451/00* (2013.01)

(58) Field of Classification Search
  CPC ... B32B 7/023; B32B 5/022; B32B 2260/021; B32B 2307/402; B32B 2307/412; B32B 2451/00
  See application file for complete search history.

(56) References Cited

FOREIGN PATENT DOCUMENTS

| JP | S59215636 | 12/1984 |
|----|-----------|---------|
| JP | H0234891  | 2/1990  |
| JP | 2004101712 | 4/2004 |
| JP | 2005077874 | 3/2005 |
| JP | 2005319585 | 11/2005 |
| JP | 2006227294 | 8/2006  |

(Continued)

OTHER PUBLICATIONS

"International Search Report (Form PCT/ISA/210) of PCT/JP2020/009906", dated Jun. 2, 2020, with English translation thereof, pp. 1-6.

(Continued)

*Primary Examiner* — Lawrence D Ferguson
(74) *Attorney, Agent, or Firm* — JCIPRNET (57) ABSTRACT

To provide a decorative molded article that enables clear visual recognition of an arbitrary pattern on a surface of a skin material when a light source is turned on. The decorative molded article is a decorative molded article capable of being illuminated by a light source on a back surface and configured so that a skin material having an OD value of 1 or more and 3.5 or less, a light-shielding layer having an arbitrary pattern, and a transparent molded body are laminated together in sequence, and so that a color difference ΔE between a light emitting unit and a non-light emitting unit of the skin material is 50 or more when the light source is turned on. The decorative molded article may further include a nonwoven fabric between the skin material and the light-shielding layer, or between the light-shielding layer and the molded body.

2 Claims, 7 Drawing Sheets

(56) References Cited

FOREIGN PATENT DOCUMENTS

| | | |
|---|---|---|
| JP | 2016081817 | 5/2016 |
| JP | 2020055151 | 4/2020 |
| WO | 2019087949 | 5/2019 |

OTHER PUBLICATIONS

"Office Action of Japan Counterpart Application", with English translation thereof, daated Jan. 5, 2021, p. 1 -p. 6.

(RELATED ART)

DECORATIVE MOLDED ARTICLE

CROSS-REFERENCE TO RELATED APPLICATION

This application is a continuation application of International Application number PCT/JP2020/009906, filed on Mar. 9, 2020, which claims the priority benefit of Japan application no. 2019-079182, filed on Apr. 18, 2019. The entirety of each of the above-mentioned patent applications is hereby incorporated by reference herein and made a part of this specification.

BACKGROUND

Technical Field

The present invention relates to a decorative molded article.

Related Art

Figure 8:
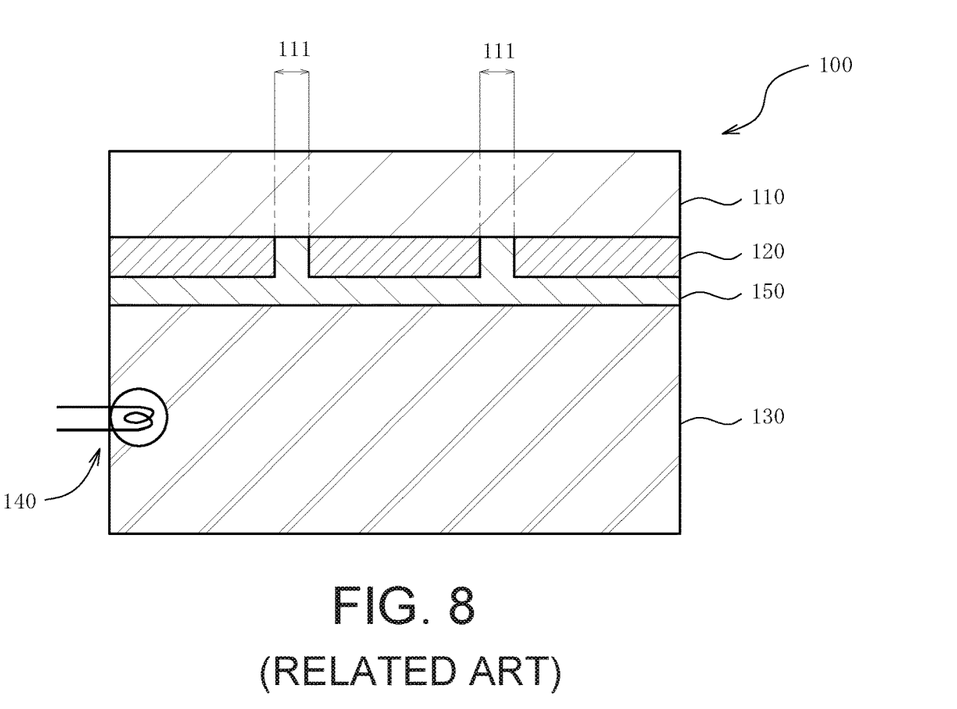
FIG. 8 is a schematic cross-sectional view showing a conventional decorative molded article.

There is a decorative molded article in which an arbitrary pattern is displayed on a surface by transmitting light from a light source. For example, Patent literature 1 discloses a decorative molded article 100 in which a skin material 110 having a leather-like appearance is bonded to a light guide body 130 having a built-in light source 140 via an adhesive layer 150 (see FIG. 8). A light-shielding layer 120 having an arbitrary pattern is formed on a back surface of the skin material. This decorative molded article has a leather-like appearance when the light source does not light up, and has a high-class feel. In addition, by transmitting light from a light emitting unit 111 when the light source is turned on, an arbitrary pattern can be displayed.

LITERATURE OF RELATED ART

Patent Literature

Patent literature 1: Japanese Patent Laid-Open No. 2016-081817

SUMMARY

Problems to be Solved

However, conventional decorative molded articles having a skin material only need to simply show an arbitrary pattern on a surface of the skin material when the light source is turned on, and a problem of how clearly the arbitrary pattern can be visually recognized on the surface of the skin material has not yet been solved.

The present invention has been made to solve the above problem, and an objective thereof is to provide a decorative molded article that enables clear visual recognition of an arbitrary pattern on a surface of a skin material when a light source is turned on.

Means to Solve Problems

Hereinafter, a plurality of aspects are described as means for solving the problem. These aspects can be arbitrarily combined as needed.

A decorative molded article of the present invention is a decorative molded article capable of being illuminated by a light source on a back surface, wherein a skin material having an OD value of 1 or more and 3.5 or less, a light-shielding layer having an arbitrary pattern, and a transparent molded body are laminated together in sequence, and a color difference $\Delta E$ between a light emitting unit and a non-light emitting unit of the skin material is 50 or more when the light source is turned on.

The decorative molded article may further include a nonwoven fabric between the skin material and the light-shielding layer, or between the light-shielding layer and the molded body.

Effect

The decorative molded article of the present invention is a decorative molded article capable of being illuminated by a light source on a back surface and configured so that a skin material having an OD value of 1 or more and 3.5 or less, a light-shielding layer having an arbitrary pattern, and a transparent molded body are laminated together in sequence, wherein a color difference $\Delta E$ between a light emitting unit and a non-light emitting unit of the skin material is 50 or more when the light source is turned on.

Thus, the decorative molded article of the present invention enables clear visual recognition of an arbitrary pattern when a light source is turned on.

BRIEF DESCRIPTION OF THE DRAWINGS

In FIG. 1, (a) of FIG. 1 is a schematic perspective view showing an example of a decorative molded article, and (b) of FIG. 1 is a cross-sectional view taken along an A-A line in (a) of FIG. 1.

DESCRIPTION OF THE EMBODIMENTS

Hereinafter, an example of an embodiment of a decorative molded article of the present invention is described with reference to the drawings.

Figure 1:
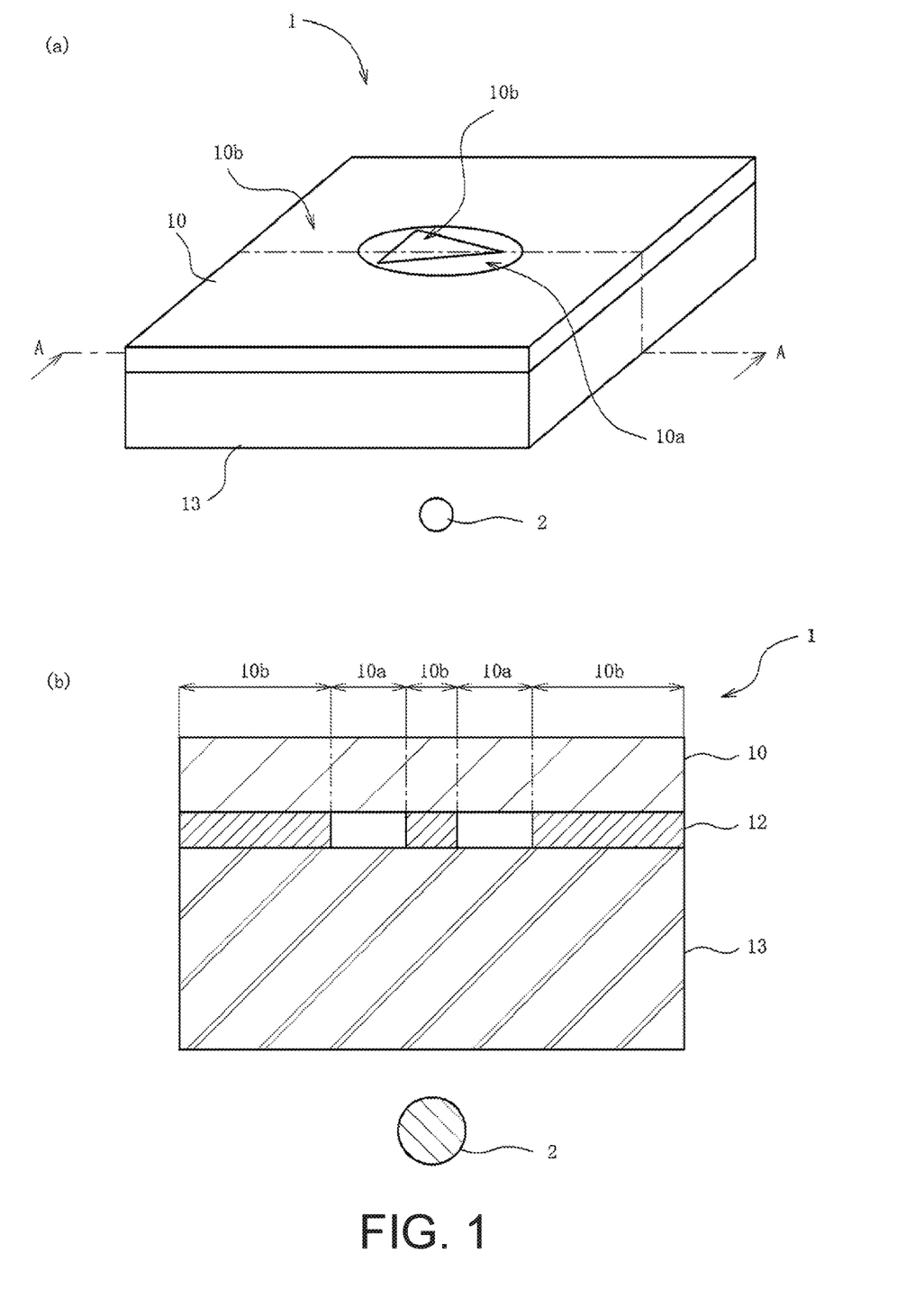

A decorative molded article 1 is a decorative molded article capable of being illuminated by a light source 2 on a back surface, wherein a skin material 10 having an OD value of 1 or more and 3.5 or less, a light-shielding layer 12 having an arbitrary pattern, and a transparent molded body 13 are laminated together in sequence, and a color difference $\Delta E$ between a light emitting unit 10a and a non-light emitting unit 10b of the skin material is 50 or more when the light source 2 is turned on (see FIG. 1).

Figure 2:
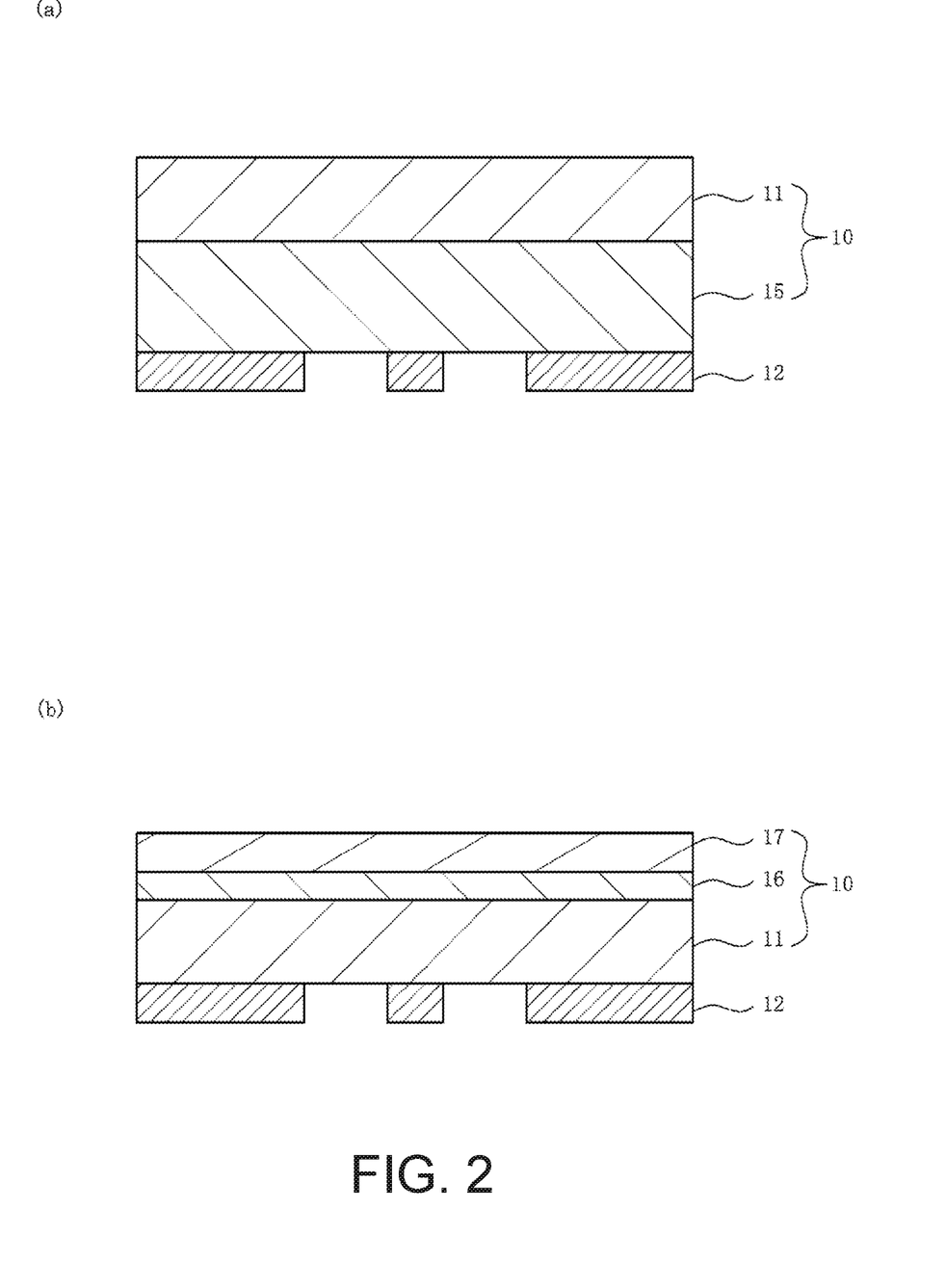
FIG. 2 is a schematic cross-sectional view showing another example of a skin material.

The skin material 10 includes a skin layer 11. For materials of the skin layer 11, for example, polyethylene terephthalate resin, polycarbonate resin, acrylic resin, urethane resin, polyvinyl chloride resin (PVC), silicone resin, fluororesin, thermoplastic elastomer resin (olefin, urethane, styrene, and the like), artificial leather, synthetic leather, a flocked sheet, a fabric, a veneer made from wood materials or stone, and the like can be used. The skin material 10 may include only the skin layer 11, or may have other layers. The other layers may be, for example, a flexible layer 15 formed on a back surface of the skin material 10 (see (a) of FIG. 2), a printing layer 16 formed on a front surface of the skin material 10, a surface treatment layer 17 formed on an outermost surface of the skin material 10 (see (b) of FIG. 2), and the like. The flexible layer 15 is, for example, a layer made of a nonwoven fabric, a foamed resin, or the like and having a cushioning property. The printing layer 16 is, for example, an arbitrary pattern formed by using an ink, or the like. The surface treatment layer 17 is, for example, a resin layer containing organic particles, and can impart abrasion resistance, a smooth touch feeling, and the like to the skin material 10.

The skin material 10 has an optical density (OD) value of 1 or more and 3.5 or less. When the skin material 10 includes only the skin layer 11, an OD value of the skin layer 11 is 1 or more and 3.5 or less. When at least one of the flexible layer 15, the printing layer 16, and the surface treatment layer 17 is formed, the OD value of the skin material 10 including these layers is 1 or more and 3.5 or less. The skin material 10 can be manufactured by, for example, mixing the material of the skin layer 11 with a pigment or a dye as needed. Alternatively, the skin material 10 may be manufactured by coating the material of the skin layer 11 with an ink containing a pigment or a dye as needed. In addition, the skin material 10 may be manufactured in a manner that a transfer sheet in which a transfer layer including an ink layer is formed is used to transfer on the skin layer 11.

If the OD value of the skin material is less than 1, even when the light source 2 on the back surface of the decorative molded article 1 does not light up, the skin material 10 has an insufficient concealing property, and therefore a pattern of the light-shielding layer 12 can be seen. If the OD value of the skin material exceeds 3.5, even when the light source 2 is turned on, the skin material 10 is too concealed, and therefore the pattern becomes less likely to be visually recognized. Note that, the OD value of 1 or more and 3.5 or less is approximately 0.03% or more and 10% or less when converted to a transmittance.

Figure 3:
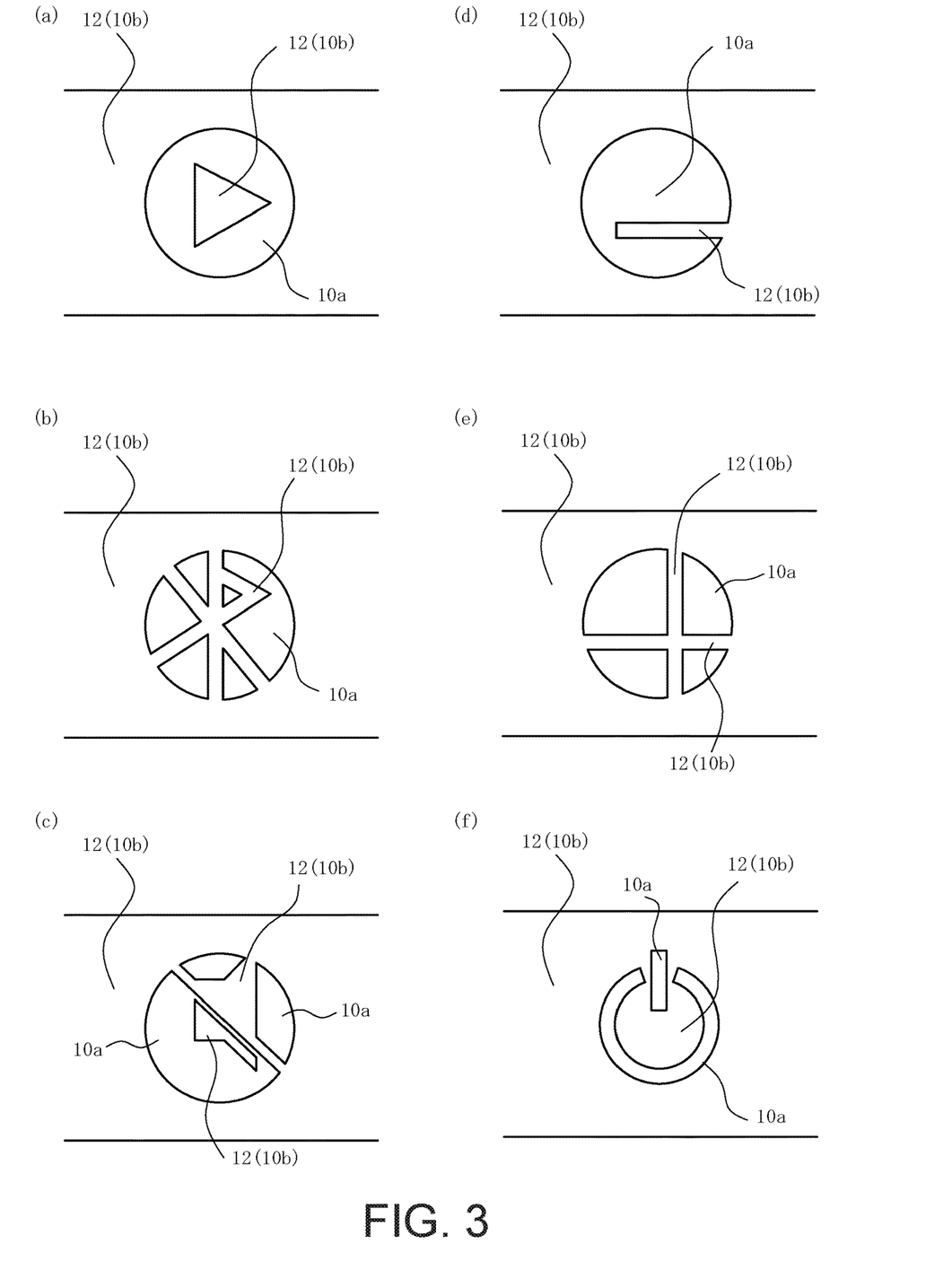
FIG. 3 is a schematic plan view showing an example of an arbitrary pattern.

The light-shielding layer 12 has an arbitrary pattern. As an arbitrary pattern, for example, an icon as shown in (a) of FIG. 3 to (f) of FIG. 3 can be used. Note that, FIG. 3 is a schematic plan view of an icon pattern. The light-shielding layer 12 can be formed by, for example, the following methods: 1) a method of directly printing an arbitrary pattern on the skin material 10; 2) a method in which a film having the light-shielding layer printed with an arbitrary pattern is laminated on the skin material 10; 3) a method in which a light-shielding seal on which an arbitrary pattern is formed is bonded to the skin material 10; and 4) a method in which a light-shielding sheet is laminated on the entire surface of the skin material, and the light-shielding sheet placed on a location where light transmission is desired is removed by a laser or the like; and the like.

The molded body 13 is transparent, and as a material of the molded body 13, for example, a thermoplastic resin, a thermosetting resin, a fiber-reinforced resin, a foamed resin, a two-component reaction curing resin, or the like can be used. Here, the term "transparent" includes translucent and colored transparent.

As the light source 2, for example, a known light source such as a temperature radiation light source (a halogen lamp, and the like), a discharge light emission light source (a metal halide lamp, and the like), an electroluminescent light source (a LED, an inorganic EL, an organic EL, and the like), or the like can be used. The light source may be in any form of surface emission, line emission, point emission, or a combination thereof.

In the decorative molded article 1, when the light source 2 on the back surface is turned on, the color difference ΔE between the light emitting unit 10a and the non-light emitting unit 10b of the skin material 10 is 50 or more. The color difference ΔE can be calculated by the following formula.

$$\Delta E = \sqrt{(\Delta a^*)^2 + (\Delta b^*)^2 + (\Delta L^*)^2} \qquad \text{[Equation 1]}$$

Here, Δa*, Δb*, and ΔL* are respectively values obtained by differences between values of a*, b*, and L* of the light emitting unit 10a and values of a*, b*, and L* of the non-light emitting unit 10b (that is, a part where the light-shielding layer 12 is formed) in a CIE1976 color space.

For example, in (a) of FIG. 3, when the light source is turned on, a pattern with a triangle inside a circle appears on the surface of the skin material. The circle around the triangle is the light emitting unit 10a, and the triangle part is the non-light emitting unit 10b. Furthermore, a part outside the circle is the non-light emitting unit 10b. In a case of this pattern, the color difference ΔE between the non-light emitting unit 10b (triangle) at the center and the light emitting unit 10a (circle) around thereof is 50 or more. In addition, the color difference ΔE between the light emitting unit 10a (circle) and the non-light emitting unit 10b around thereof is also 50 or more. As a method for increasing the color difference ΔE between the light emitting unit and the non-light emitting unit in the skin material to 50 or more, for example, the following method can be used.

1) Changing a color of the skin material without changing a light color of the light source.

2) Changing the light color of the light source without changing the color of the skin material.

In the above (1), for example, if the light color is white, the skin material is set to a yellowish white color such as ivory or the like, and a color other than white. The above (2) further includes, for example, the following two types.

2-1) Changing the light color of the light source.

2-2) Changing the light color by arranging a colored layer on the decorative molded article.

A position of the colored layer in the above (2-2) may be a position corresponding to the light emitting unit 10a between the skin material 10 and the molded body 13. In addition, as the colored layer, for example, a cellophane, a paper, a colored transparent printing layer, or the like can be used. Moreover, the molded body 13 may be molded by a colored transparent resin to form a colored layer.

Since the OD value of the skin material in the decorative molded article 1 of the present invention is 1 or more and 3.5 or less, when the light source 2 does not light up, an arbitrary pattern can be reliably concealed due to the concealing property of the skin material. On the other hand, when the light source 2 is turned on, the OD value of the skin material is 1 or more and 3.5 or less, and thus a sufficient amount of light can pass through the light emitting unit 10a of the skin material 10. In addition, because the color difference ΔE between the light emitting unit 10a and the non-light emitting unit 10b in the skin material when the light source 2 is turned on is 50 or more, an arbitrary pattern can be clearly visually recognized on the surface of the skin material.

Figure 4:
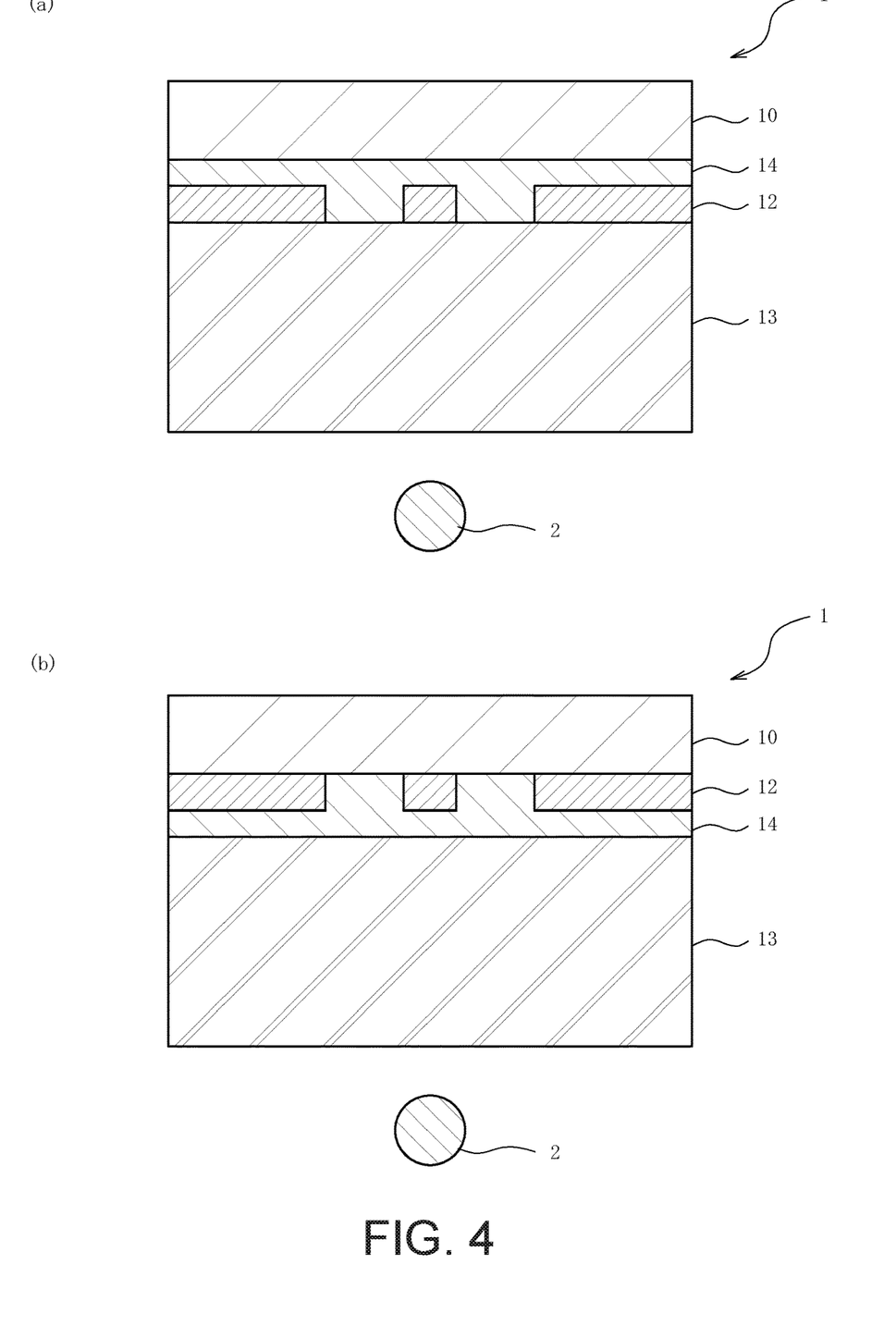
FIG. 4 is a schematic cross-sectional view showing another example of the decorative molded article.
Figure 5:
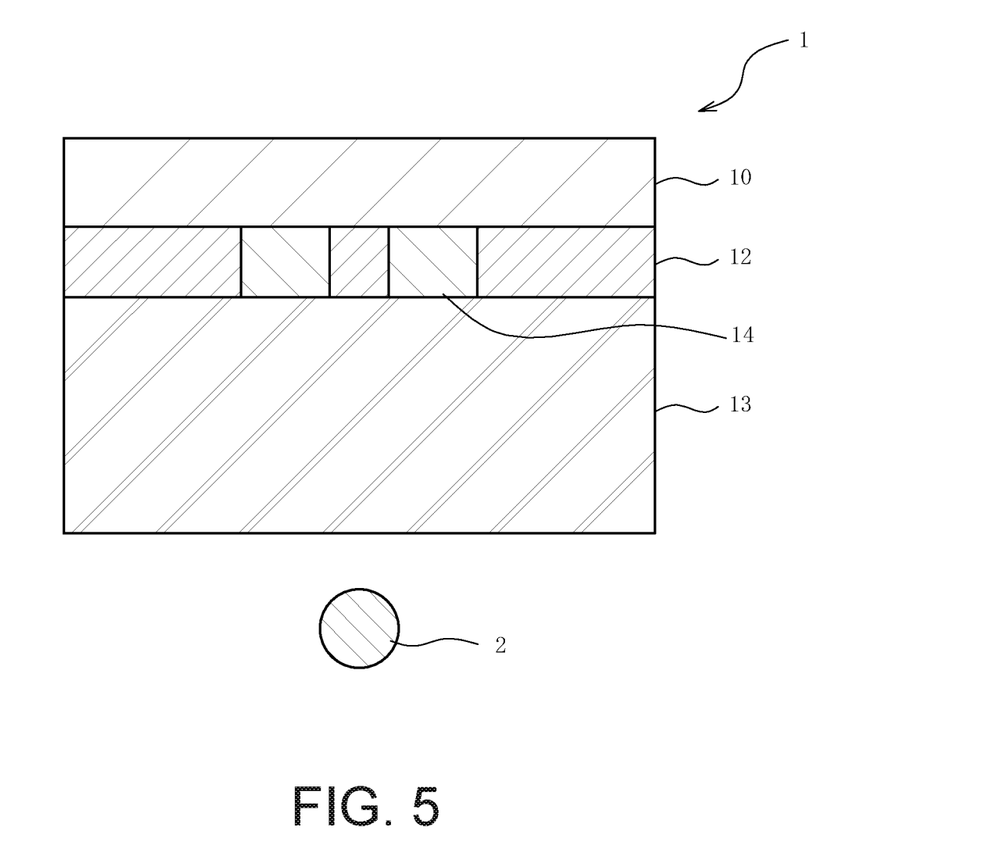
FIG. 5 is a schematic cross-sectional view showing another example of the decorative molded article.

The decorative molded article 1 may further include a nonwoven fabric 14. A position of the nonwoven fabric 14 is between the skin material 10 and the light-shielding layer 12 (see (a) of FIG. 4), or between the light-shielding layer 12 and the molded body 13 (see (b) of FIG. 4). The light-shielding layer can be formed by, for example, the following methods: 1) a method of directly printing on the nonwoven fabric; 2) a method of bonding the light-shielding seal to the nonwoven fabric; and 3) a method of impregnating the nonwoven fabric with a pigment or a dye having a light-shielding property. The light-shielding seal used in the method (2) may have an adhesive layer on only one side, or may have adhesive layers on both sides. When the light-shielding layer is formed by the method (3), for example, as shown in FIG. 5, a thickness of the nonwoven fabric 14 and a thickness of the light-shielding layer 12 are the same.

Figure 6:
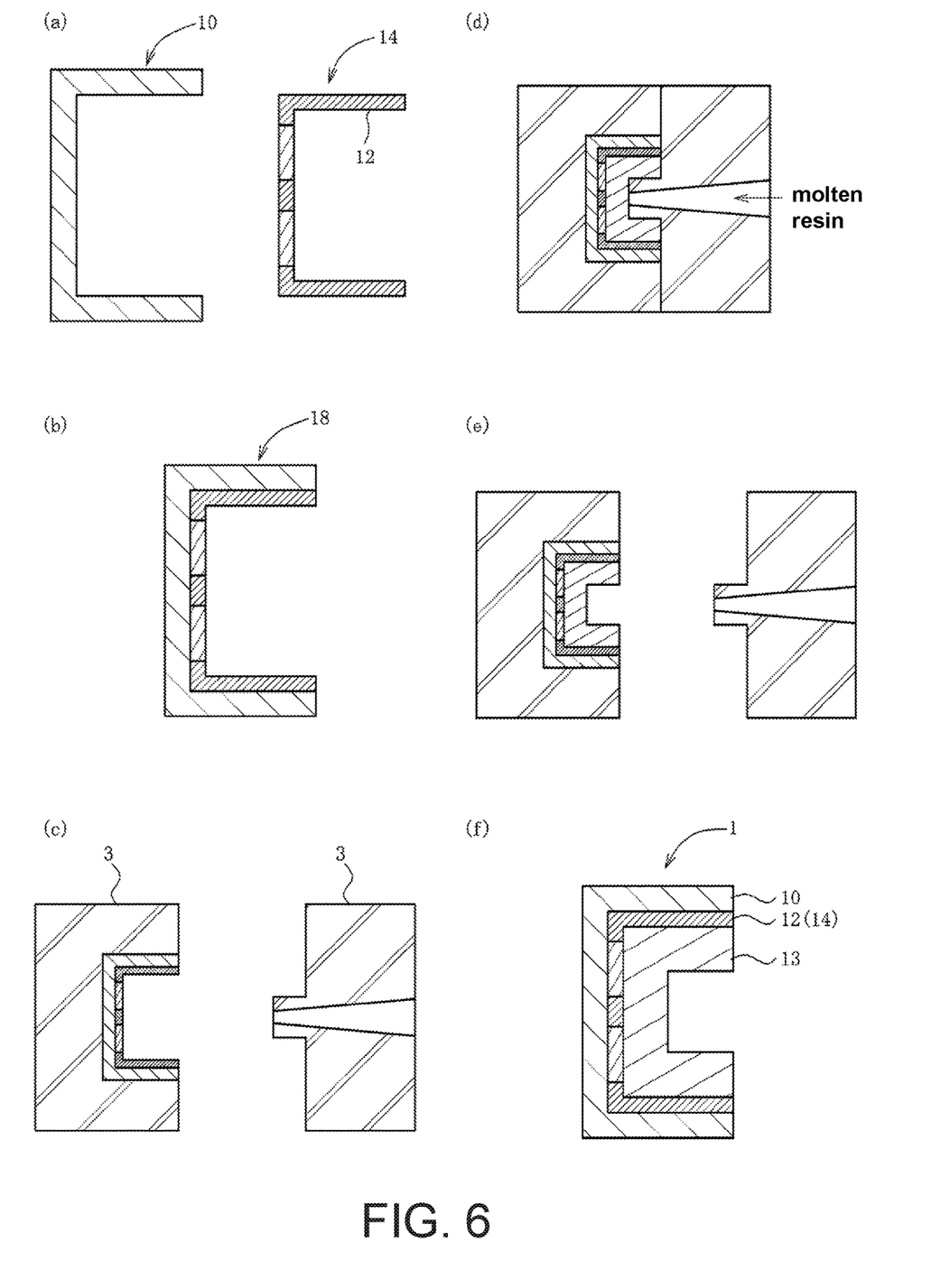
FIG. 6 is a schematic cross-sectional view showing an example of a method for manufacturing the decorative molded article.
Figure 7:
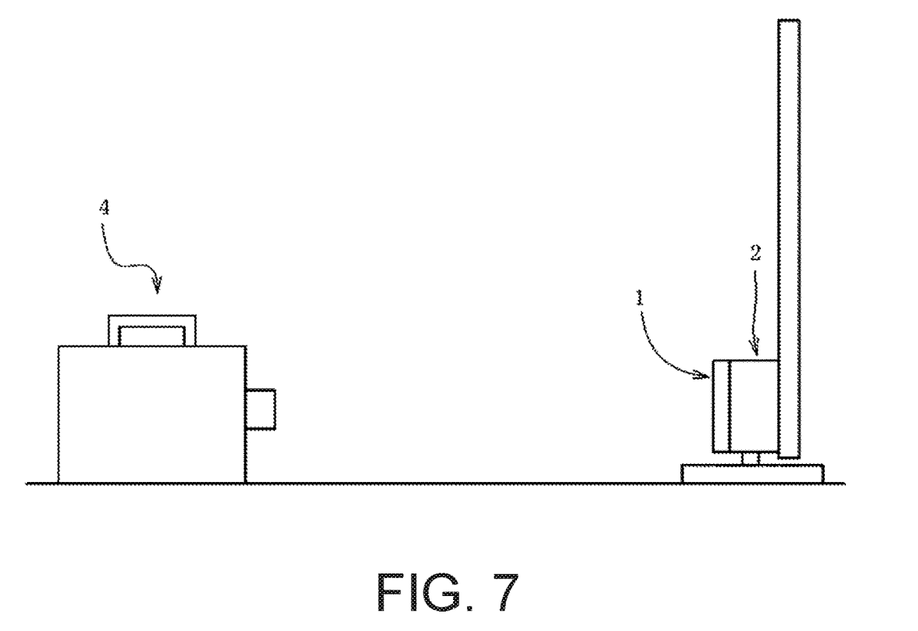
FIG. 7 is a schematic side view showing a method for measuring a color difference in an example.

When the nonwoven fabric with a light-shielding layer manufactured by any of the above methods (1) to (3) is used, there are the following advantages in the manufacture of the decorative molded article 1. When the decorative molded article 1 is obtained by, for example, injection molding, if the nonwoven fabric equipped with a light-shielding layer in advance is used, the nonwoven fabric can be easily preformed as compared with a case of using a film equipped with a light-shielding layer. In the case of the film, it is necessary to heat and soften the film before the film is preformed. However, in the case of the nonwoven fabric, the nonwoven fabric can be preformed only by a mold clamping force (pressure) of the mold without heating the nonwoven fabric. The preformed nonwoven fabric 14 with a light-shielding layer obtained in this way is bonded to the skin material 10 (see (a) of FIG. 6 and (b) of FIG. 6), the bonded article is inserted into a pair of molds (see (c) of FIG. 6), and the decorative molded article 1 can be obtained by the injection molding ((d) of FIG. 6 to (f) of FIG. 6).

In addition, when a skin material such as synthetic leather having a very strong cushioning property is used, because the rigidity of the skin material is not sufficient, the skin material is less likely to maintain the shape thereof even if the skin material is preformed. However, by bonding the nonwoven fabric described above on the skin material, a lack of the rigidity of the skin material can be compensated, and the preformed shape can be maintained. Thus, the skin material can be easily inserted into the mold.

EXAMPLE

1. Measurement Environment

Camera used: TOPCON SR-5000 (manufactured by Topcon Co., Ltd.)

(Spectroradiometer Capable of Surface Measurement)

Light source: LED, maximum brightness about 500,000 cd/m$^2$

Distance between surface of decorative molded article and camera: 350 to 400 mm

2. Measurement Method

The decorative molded article 1 having all the patterns shown in (a) of FIG. 3 to (f) of FIG. 3 was used. Under a fluorescent lamp, the light source 2 lit up from the back surface of the decorative molded article 1, and an image of the surface of the decorative molded article was taken with a camera 4. In the image, color data (L*, a* and b*) of each of the light emitting unit and the non-light emitting unit was extracted by designating the light emitting unit and the non-light emitting unit in the skin material. The color difference ΔE between the light emitting unit and the non-light emitting unit in the skin material was calculated based on the color data. Moreover, a brightness of the light source was kept constant at 300,000 cd/m$^2$.

3. Visibility Evaluation

Regarding the visibility, the light source 2 lit up in a room under a three-wavelength light source, the pattern (icon) of the decorative molded article 1 was visually checked from the same position as the camera 4, and the visibility was evaluated as "○", "Δ", and "x". "○" refers to a level at which the icon can be visually recognized clearly, "Δ" refers to a level at which the icon can be visually recognized to light up, but details and outlines are blurred and clear visual recognition cannot be made, and "x" refers to a level at which visual recognition in light-up of the icon is difficult, or visual recognition cannot be made unless the icon is at a close distance.

Results are shown in table 1.

TABLE 1

| Example/Comparative example | OD value | Skin material Type | Color | Color difference ΔE (Difference between light emitting unit and non-light emitting unit) | Brightness (cd/m$^2$) | Visibility |
|---|---|---|---|---|---|---|
| Example 1 | 1.6 | Synthetic leather | Black | 343.7 | 101.4 | ○ |
| Example 2 | 1.6 | Suede | Light gray | 144.1 | 160.4 | ○ |
| Example 3 | 2.2 | Suede | Brown | 74.2 | 49.5 | ○ |
| Example 4 | 2.7 | Synthetic leather | Black | 56.1 | 11.8 | ○ |
| Example 5 | N/A | Wood material | Brown | 417.1 | 332.6 | ○ |
| Comparative example 1 | 2.3 | Suede | Ivory | 40.6 | 77.7 | Δ |
| Comparative example 2 | 2.6 | Synthetic leather | Milky white | 18.7 | 101.9 | x |
| Comparative example 3 | 3.7 | Suede | Red | 24.2 | 4.3 | Δ |
| Comparative example 4 | 4.1 | Suede | Black | 12.4 | 1.7 | x |

Moreover, because an OD value of the wood material of Example 5 varied greatly depending on a woodgrain, the date could not be obtained. In addition, the brightness is an index indicating the lightness of the light emitting pattern.

In the decorative molded articles of Examples 1 to 5, because the OD value of the skin material was 1 or more and 3.5 or less and the color difference ΔE between the light emitting unit and the non-light emitting unit in the skin material was 50 or more, the visibility of pattern was good. In the decorative molded article of Comparative example 1, the OD value of the skin material was 2.3, and the color difference was 40.6. Because the color difference was close to an upper-limit value of 50, the visibility of pattern was slightly reduced as compared with the examples. In the decorative molded article of Comparative example 2, the OD value of the skin material was 2.6, but the color difference was 18.7 and was not sufficient, and thus the visibility of pattern was poor. In the decorative molded article of Comparative example 3, the color difference was 24.2 and was not sufficient, and the OD value of the skin material was 3.7. Because the OD value of the skin material was close to an upper-limit value of 3.5, the visibility of pattern was slightly reduced as compared with the examples. In the decorative molded article of Comparative example 4, because the OD value of the skin material exceeded the upper-limit value of 3.5 and the color difference was not sufficient, the visibility of the pattern was poor.

What is claimed is:

1. A decorative molded article, capable of being illuminated by a light source on a back surface, wherein
 a skin material having an OD value of 1 or more and 3.5 or less, a light-shielding layer having an arbitrary pattern, and a transparent molded body are laminated together in sequence; and
 a color difference $\Delta E$ between a light emitting unit and a non-light emitting unit of the skin material is 50 or more when the light source is turned on,
 the decorative molded article further comprises a nonwoven fabric between the skin material and the light-shielding layer, or between the light-shielding layer and the molded body.

2. The decorative molded article according to claim 1, wherein the light-shielding layer is formed by impregnating the nonwoven fabric with a pigment or a dye having a light-shielding property.

\* \* \* \* \*